United States Patent
Kabrich et al.

(10) Patent No.: US 7,052,424 B2
(45) Date of Patent: May 30, 2006

(54) CANTILEVER TOOTH SPROCKET

(75) Inventors: Todd R. Kabrich, Creve Coeur, IL (US); Morris E. Taft, Peoria, IL (US); Stephen C. Todd, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 817 days.

(21) Appl. No.: 10/360,771

(22) Filed: Mar. 29, 2001

(65) Prior Publication Data

US 2005/0075206 A1 Apr. 7, 2005

(51) Int. Cl.
*F16H 55/12* (2006.01)

(52) U.S. Cl. .................. 474/162; 474/161; 305/195; 305/199; 301/30; 301/31

(58) Field of Classification Search .................. 474/152, 474/153, 154, 155, 156, 160, 161, 95, 96, 474/162; 305/195, 199; 301/30, 31
See application file for complete search history.

(56) References Cited

U.S. PATENT DOCUMENTS

| | | | | |
|---|---|---|---|---|
| 1,114,234 A | | 10/1914 | Curtis | |
| 3,173,301 A | * | 3/1965 | Miller | 474/163 |
| 3,899,219 A | * | 8/1975 | Boggs | 474/162 |
| 4,111,064 A | * | 9/1978 | Purcell | 474/162 |
| 4,332,573 A | * | 6/1982 | Uchida et al. | 474/94 |
| 4,881,930 A | | 11/1989 | Oertley | |
| 2003/0083166 A1 | * | 5/2003 | Oertley | 474/162 |

* cited by examiner

*Primary Examiner*—Thomas R. Hannon
*Assistant Examiner*—Bradley J. Van Pelt
(74) *Attorney, Agent, or Firm*—Calvin E. Glastetter; Jeff A. Greene; J. W. Burrows

(57) ABSTRACT

A drive sprocket assembly for driving an endless chain assembly for propelling a machine has a hub portion and flexible cantilever teeth in which each tooth is separately deflectable upon impact by a bushing of the endless chain assembly. The flexibility of each tooth will absorb a portion of the kinetic energy of the impact to reduce noise in the structure. The drive sprocket assembly includes a plurality of segments each having the cantilever teeth. Each segment has a first end portion and a second end portion having an end relief which prevents wear between the segment and the hub as the end portion is deflected by the impact.

14 Claims, 4 Drawing Sheets

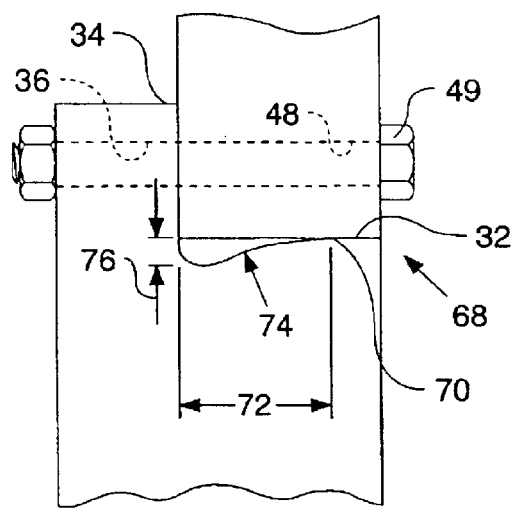
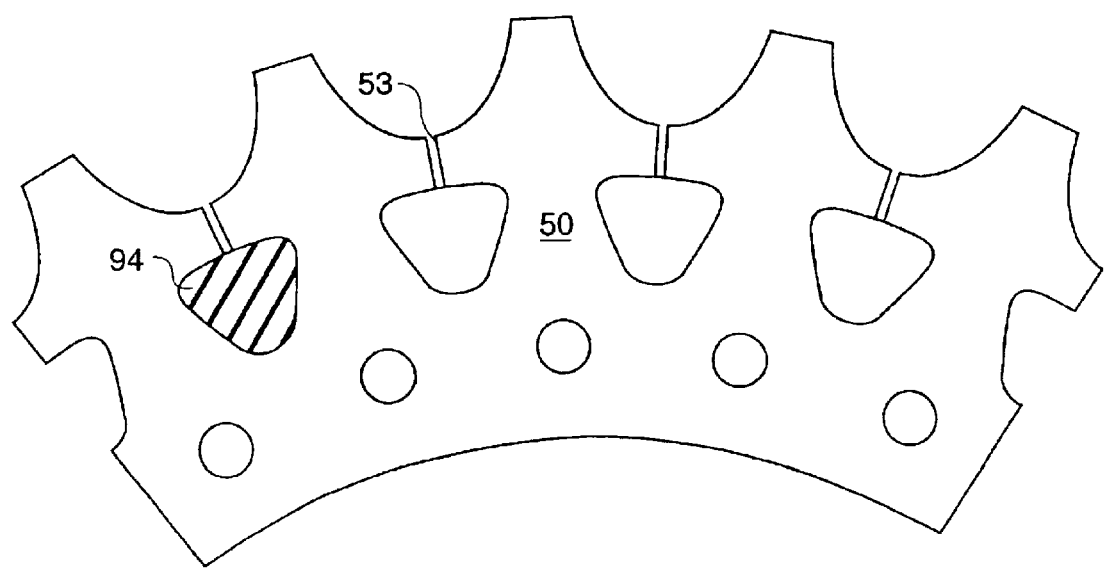

CANTILEVER TOOTH SPROCKET

TECHNICAL FIELD

This invention relates generally to a drive sprocket and more particularly to a drive sprocket formed by segments having cantilever teeth formed thereon for reducing noise during operation.

BACKGROUND

Earthmoving and construction type machines, which have endless self-laying track chain assemblies for support and propulsion, generally utilize a sprocket wheel to engage and drive the track chain. Several different types of sprocket wheels have been used in the past, including a single wheel member having a plurality of integral teeth, a circular support member for supporting a number of wheel segments, each segment having a plurality of teeth. However, many prior drive sprocket constructions have been ineffective, or quite limited, in their ability to reduce noise levels during driving operation against an endless track chain assembly.

One attempt to provide a reduced noise sprocket assembly is disclosed in U.S. Pat. No. 4,881,930 for a Sprocket Assembly, granted Nov. 21, 1989, to Thomas Oertley assigned to the assignee of the present invention. The sprocket assembly described in the referenced Oertley patent produces low levels of noise by utilizing individually replaceable tooth structures which are resiliently isolated from the support housing and from adjoining tooth structures. That arrangement requires many components, including resilient pads between adjacently disposed teeth retaining members and pins to hold the resilient pads in place, and a resilient cushion band positioned between the hub of the drive sprocket and the tooth structures.

The present invention is directed to overcoming one or more of the problems as set forth above.

SUMMARY OF THE INVENTION

In one aspect of the present invention, a drive sprocket assembly is adapted for rotation about an axis. The drive sprocket assembly includes a circular hub concentrically disposed about the axis. The circular hub has an outer periphery. The drive sprocket assembly includes a plurality of arcuate segments positioned around the outer periphery of the hub. Each one of the arcuate segments having a first end portion, a second end portion, and an intermediate portion. The first and second end portions having an end relief thereon. The arcuate segment having a plurality of cantilever teeth formed thereon and a reduced cross-section web extending outwardly.

The present invention provides a drive sprocket assembly having tooth segments which have a cantilever teeth which deflects to absorb the impact energy between the track chain and the cantilever tooth in order to reduce noise during use. The tooth segments also have end portions having an end relief to prevent wear between the segment and the hub as the end portion deflects from the impact.

BRIEF DESCRIPTION OF THE DRAWINGS

FIG. 4 is a diagrammatic sectional view taken along line the line 4—4 of FIG. 2;

FIG. 6 is a side view of the sprocket segment showing an alternate embodiment.

DETAILED DESCRIPTION

Figure 1:
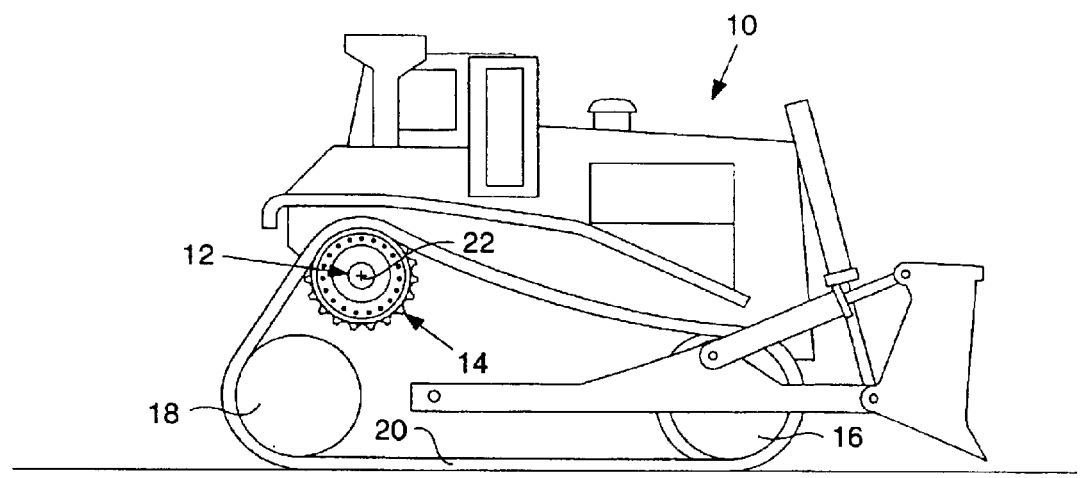
FIG. 1 is a diagrammatic side view of a machine incorporating the sprocket of the present invention.

With reference to drawings and specifically to FIG. 1, a machine 10, such as a track-type tractor has a powered drive system 12, a resilient drive sprocket assembly 14 embodying the present invention, first and second idler wheels 16,18, and an endless track chain assembly 20 which encircles the sprocket assembly and the idler wheels 16,18. The endless chain includes a plurality of bushings 21 which interact with sprocket to propel the machine. The sprocket assembly 14 is adapted to transfer power from the machine 10 to the track assembly 20. It is to be understood that many of the machine component, including the sprocket assembly 14, the idler wheel 16,18 and the track chain assembly 20 are duplicated on the on the other side of the machine 10 which is not illustrated. Since these duplicated components operate in the same manner as those shown, the description and operation of the components illustrated applies to both sides of the machine.

Figure 2:
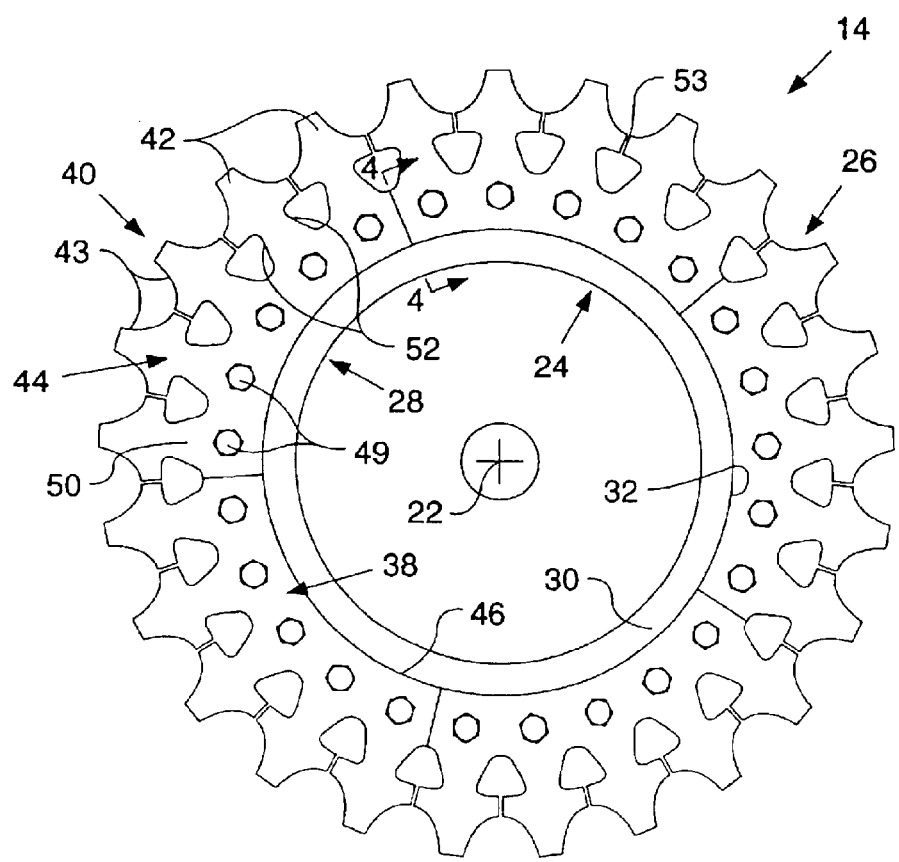
FIG. 2 is a diagrammatic side view of the sprocket assembly embodying the present invention.
Figure 3:
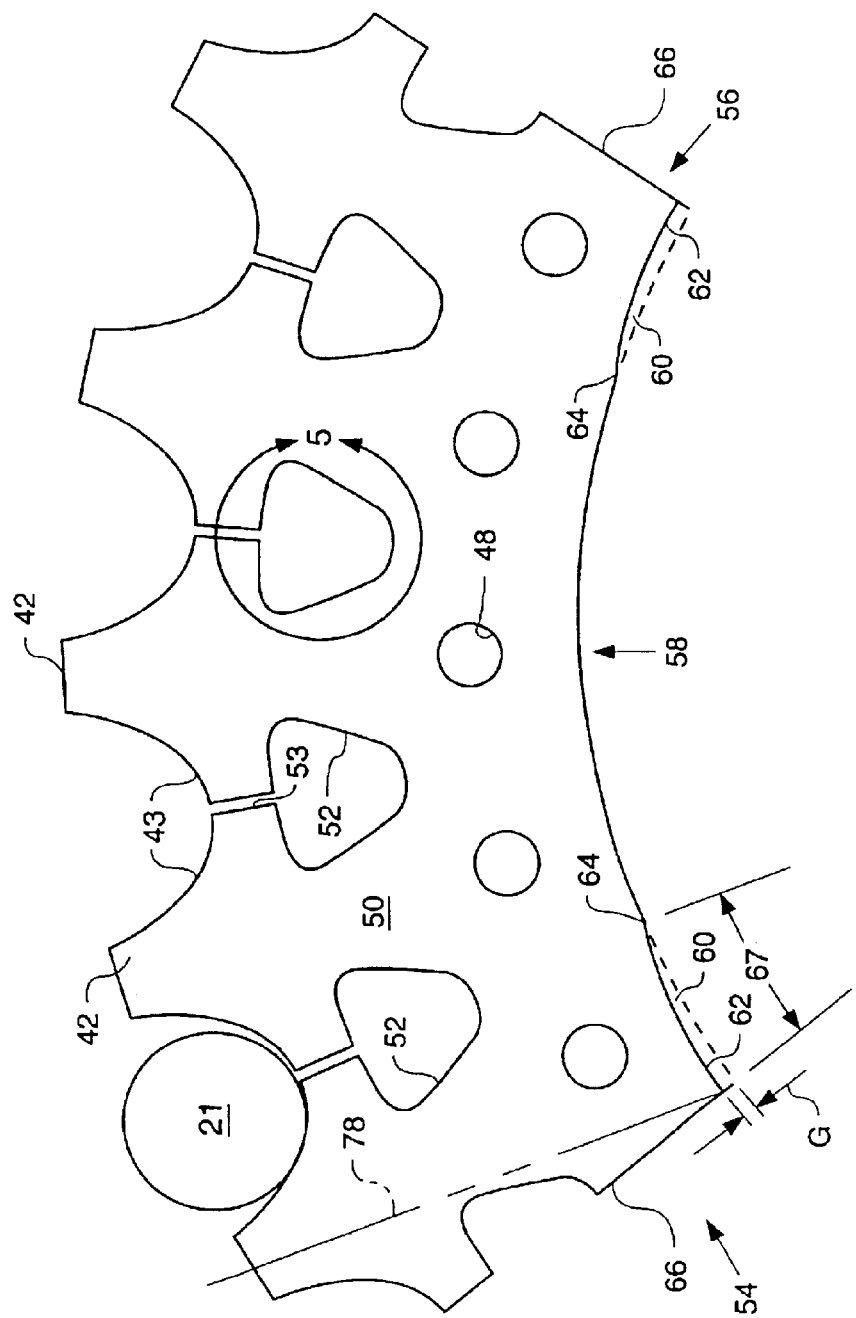
FIG. 3 is an enlarged side view of a sprocket segment embodying the present invention.

The resilient drive sprocket assembly 14 rotates about a central axis 22 as identified in FIGS. 1–3. The resilient drive sprocket assembly 14 includes a housing 24 concentrically disposed about the axis 22 and a plurality of arcuate shaped drive tooth segments 26 positioned axially around the housing 24. The housing 24 has a mounting portion 28, a circular hub portion 30 having a radial outer surface 32, and a circular flange 34 extending radially outwardly from the hub portion 30, all concentrically disposed about the axis of rotation 22. The circular flange 34 has a plurality of holes 36 spaced equally and axially around the circular flange 34. Each drive tooth segment, of the plurality of arcuate segments 26, have an inner or mounting base portion 38, an outer portion 40 having a plurality of cantilever teeth 42 with a track engagement surface 43, and an intermediate portion 44. The mounting base portion 38 has a curved surface 46 adapted to mate with the radial outer surface 32 of the circular hub portion 30. The mounting base portion 38 has a plurality of axially extending holes 48 adapted to align with respective hole in the flange 34 of the hub portion 30. A fastener, such as a bolt 49, is inserted into the holes 36,48 to attach the segment to the hub. Each tooth, of the plurality of teeth 42, is capable of limited deflection as a result of a reduced cross-sectional web 50 in the intermediate portion 44. The web 50 being positioned between the radially outer track assembly engaging surface 43 and the base portion 38. Adjacent webs 50 having a structure defining a window 52 which controls the deflection of the cantilever tooth 42. A slot 53 extends radially from the track engaging surface 43 to the window 52, the slot 53 having a arcuate width in the range of 1–5 mm.

As best shown in FIGS. 3 and 4, each drive tooth segment has a first end portion 54, a second end portion 56, and an intermediate portion 58. Each of the first and second end portions 54,56 has an end relief 60 which provides a gap "G" between the end portion 54,56 of the drive tooth segment and the outer surface 32 of the hub 30. The gap is provided to reduce wear between the components as the end tooth is deflected from contact with the track chain assembly. The end relief 60 is provided by a curved relief surface 62, which is greater then the curved surface 46 of the intermediate portion 58 of the mounting base portion 38, extending from an intersection point 64 with the curved surface 46 to a end 66 of the segment 26. The end relief 60 has an angle 67, extending from the end 66 to the intersection point 64, in the range of 7.2–21 degrees, and the end relief gap "G" is in the range of 0.1–0.5 mm. The outer surface 32 of the hub 30 also includes a relief portion 68 which cooperates with the end relief of the segments to further reduce wear therebetween when the end tooth is deflected. A tangent point 70 on the outer surface 32 is spaced a distance 72 from the flange 34, the distance 72 is in a range of 29.5–60.5 mm. A radius 74, in the range of 1820–4050 mm, extends generally axially from the tangent point 70 toward the flange 34. A radius of 3 mm connects the radius 74 to the flange 34. The distance 76 between the connection point and the outer surface of the hub is in the range of 0.1–0.5 mm. In order to have the proper amount of deflection of the cantilever tooth the window 52 should not intersect a plane 78. The plane extends from the center of the end tooth crown to the corner of the end relief 60 and the end 66.

Figure 5:
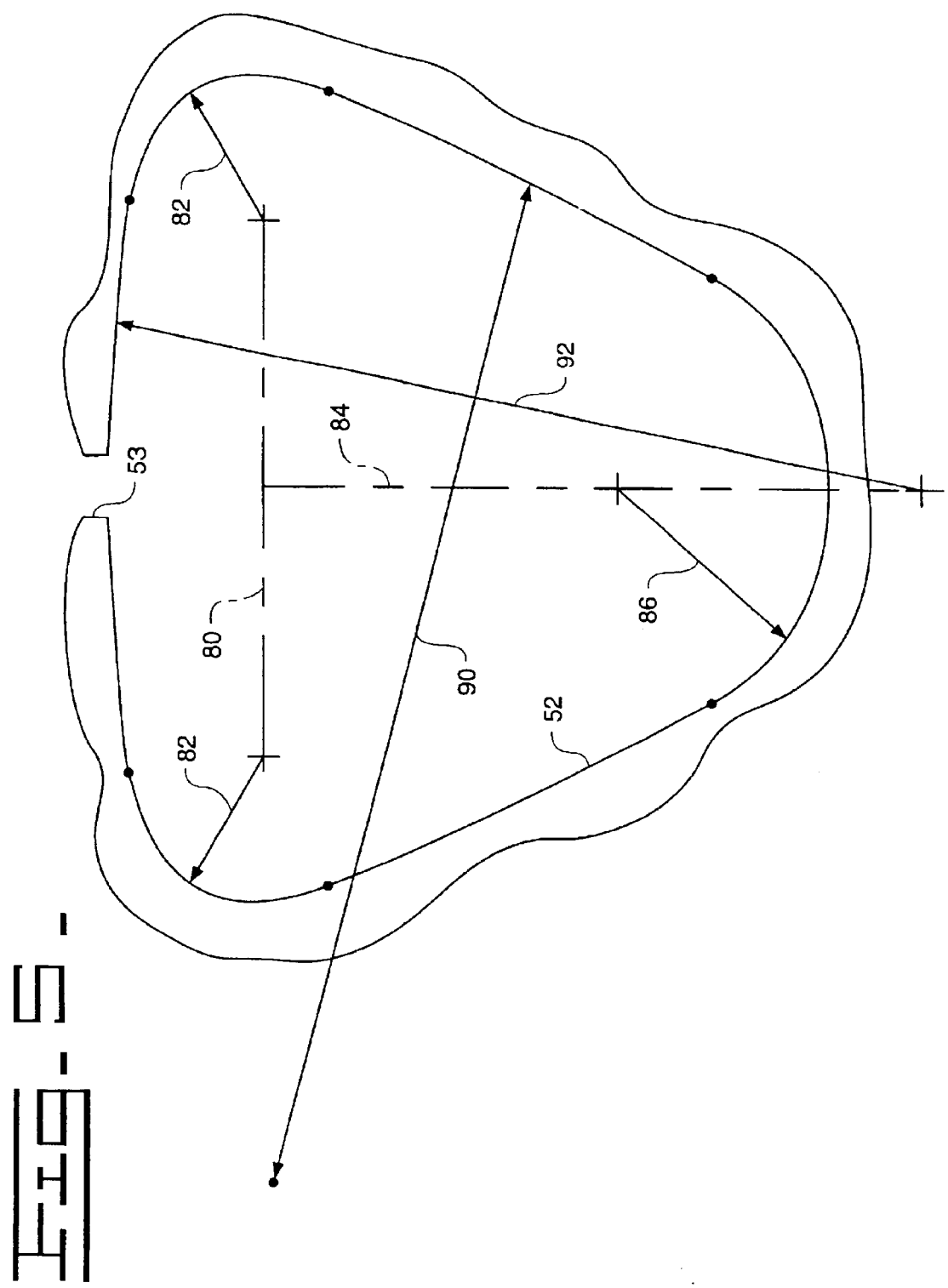
FIG. 5 is an enlarged view taken generally along line 5—5 of FIG. 3.

Now referring to FIG. 5, the predefined size and shape of the window 52 between adjacent teeth to insure the proper amount of deflection of the cantilever tooth is disclosed. A horizontal plane 80 having a predefined length in the range of 34–51 mm is provided to determine the width of the window 52. A radius 82 in the range of 6–11.5 mm is provided from the end points of the horizontal plane 80 to define the width of the window 52. A vertical plane 84 intersects the horizontal plane 80 at its midpoint and extends downwardly a predefined length in the range of 14–17.6 mm. A radius 86 is provided from the extending end point of the vertical plane 84 to define the lower limit of the window 52. The length of the horizontal plane 80 divided by the length of the vertical plane 84 should have a ratio in the range of 1.5–3.5. A radius 90 is tangential to the radius 82 and the radius 86. A radius 92 is tangential to the radiuses 82 to define the upper limit of the window 52. Instead of radius 90,92, a different line, such as straight line could be used to connect the radius without departing from the invention.

Referring to FIG. 6, the segment 26 and the window 52 are identical as previously described, however, if further dampening is desired an elastomeric material such as rubber 94 is positioned within the window 52 to further dampen noise from the track chain assembly 20 contacting the sprocket 14.

INDUSTRIAL APPLICABILITY

The cantilever tooth drive sprocket assembly 14 embodying the present invention is particularly useful with earthmoving machines, and more specifically, self-laying track-type machines such as the machine 10. Power from the engine of the machine 10 is transmitted to the drive system 12 which then rotates the sprocket assembly 14. As the sprocket assembly 14 rotates, the cantilever teeth 42 contact portions, such as bushings, of the endless track chain assembly 20 to propel the machine 10. The track bushings of the track chain assembly 20 thus engage the resilient cantilever teeth 42. Because the cantilever tooth 42 has a reduced cross-sectional web 50 and windows 52 the tooth will deflect to absorb at least a portion of the kinetic energy of the impact, thus having reduced noise.

In view of the forgoing, it is readily apparent that the structure of the present invention provides a reduced noise level sprocket assembly for driving the track chain assembly 20 by utilizing a plurality of segments 26 having a plurality of cantilever teeth which deflect to absorb impact and reduce the noise level of the track components.

Other aspects, objects and advantages of this invention can be obtained from a study of the drawings, the disclosure and the appended claims.

What is claimed is:

1. A drive sprocket assembly adapted for rotation about an axis thereof, comprising:
   a circular hub concentrically disposed about the axis, the hub having an outer periphery; and
   a plurality of arcuate segments positioned around the outer periphery of the hub, each one of the arcuate segments having a first end portion, a second end portion, an arcuate inner mounting portion having a curved surface, an arcuate outer portion, and an arcuate intermediate portion having a plurality of reduced cross-sectional webs, respective ones of a plurality of cantilevered teeth extend from associated ones of the reduced cross-sectional webs to form the arcuate outer portion, each of the first and second end portions having an end relief thereon defined by a relief surface, the relief surface having a length, that intersects both the curved surface of the arcuate inner mounting portion and respective first or second end portions of the arcuate segment, a gap defined by the relief surface has a spacing between the end of the segment and the curved surface of the arcuate inner mounting portion that is smaller than the length of the relief surface.

2. The drive sprocket assembly of claim 1, wherein the plurality of reduced cross-sectional web portions of the arcuate intermediate portion define respective windows of a predetermined size and shape each being positioned between the arcuate outer portion and the arcuate inner mounting portion.

3. The drive sprocket assembly of claim 2, wherein the window is u-shaped and has an arcuate upper surface.

4. The drive sprocket assembly of claim 2, wherein a slot of a predetermined arcuate width is defined in each segment extending between the arcuate outer portion and the respective windows.

5. The drive sprocket assembly of claim 4, wherein the segment has an end tooth which defines a structure adapted to interact with an end tooth of adjacent segments to form one of the windows.

6. The drive sprocket assembly of claim 4, wherein the slot has an arcuate width in a range of 1–5 mm.

7. The drive sprocket assembly of claim 1, wherein the surface of each of the respective end reliefs intersects the surface of the arcuate inner portion, defining an intersection point, and extends from the intersection point toward the respective first and second end portions.

8. The drive sprocket assembly of claim 7, wherein an arcuate distance from the intersection point to the end portion is in a range of 7.2–21 degrees.

9. The drive sprocket assembly of claim 8, wherein the width of the end relief gaps taken at the first or second end portions of the arcuate segment is in a range of 0.1–0.5 mm.

10. The arcuate drive segment of claim 1, wherein the plurality of reduced cross-sectional web portions of the arcuate intermediate portion define respective windows of a predetermined size and shape each being positioned between the arcuate outerportion and the arcuate inner mounting portion, each window having a width and a height,
   the width of each window defined by a horizontal plane and first and second radii having a length in a first range of 34–51 mm,
   the height of each window defined by a radius and a vertical plane that intersects the horizontal plane at its midpoint and extending a length in a second range of 14–17.6 mm, and the width of the window divided by the height of the window establishes a ratio in a third range 1.5–3.5.

11. An arcuate drive sprocket segment having a first end portion, a second end portion, an arcuate outer portion, an arcuate inner mounting portion having a curved surface, and an arcuate intermediate portion having a plurality of reduced cross-sectional webs, a plurality of cantilever teeth are formed thereon and extend from the associated ones of the plurality of reduced cross-sectional webs to form the arcuate outer portion, and an end relief being formed on the first and second end portions to define a gap relative to the curved surface of the arcuate inner mounting portion, each of the end reliefs being formed by a relief surface, the relief surface having a length, that intersects the curved surface of the arcuate inner mounting portion and the respective ends of the sprocket segment, the gap defined by the relief surface has a spacing between the end of the segment and the curved surface of the arcuate inner mounting portion that is smaller than the length of the relief surface.

12. The arcuate drive segment of claim 11, wherein the surface of each of the respective end reliefs intersects the surface of the arcuate inner portion, defining an intersection point, and extends from the intersection point toward the respective first and second end portions, defining an arcuate distance, the arcuate distance from the intersection point to the end surface having an angle in a range of 7.2–21 degrees.

13. The arcuate drive segment of claim 12, wherein the end relief gaps define a width and the width taken at the respective ends of the arcuate drive segments is in a range of 0.1–0.5 mm.

14. The arcuate drive segment of claim 11, wherein the plurality of reduced cross-sectional web portions of the arcuate intermediate portion define respective windows of a predetermined size and shape each being positioned between the arcuate outerportion and the arcuate inner mounting portion, each window having a width and a height, the width of each window is defined by a horizontal plane and first and second radii having a length in a first range of 34–51 mm, the height of each window defined by a radius and a vertical plane that intersects the horizontal plane at its midpoint and extending a length in a second range of 14–17.6 mm, and the width of the window divided by the height of the window establishes a ratio in a third range 1.5–3.5.

* * * * *